United States Patent [19]

Williams

[11] Patent Number: 5,078,532
[45] Date of Patent: Jan. 7, 1992

[54] SCAFFOLD CONNECTION

[76] Inventor: Joe W. Williams, 16325 Varnado Rd., Walker, La. 70785

[21] Appl. No.: 714,458

[22] Filed: Jun. 13, 1991

Related U.S. Application Data

[63] Continuation-in-part of Ser. No. 581,738, Sep. 13, 1990, Pat. No. 5,028,164.

[51] Int. Cl.⁵ .............................................. B25G 3/00
[52] U.S. Cl. ..................................... 403/246; 403/49; 403/174; 182/179
[58] Field of Search ............... 403/49, 175, 174, 246; 182/179, 178; 211/192

[56] References Cited

U.S. PATENT DOCUMENTS

| | | | |
|---|---|---|---|
| 835,280 | 11/1906 | Haskell . | |
| 3,179,212 | 4/1965 | Gostling | 189/19 |
| 3,195,735 | 7/1965 | Jay | 211/148 |
| 3,268,252 | 8/1966 | Rolland | 287/56 |
| 3,482,873 | 12/1969 | Pivacek | 297/429 |
| 3,490,189 | 1/1970 | Gostling | 52/648 |
| 3,817,641 | 6/1974 | Steele et al. | 403/256 |
| 3,879,143 | 4/1975 | Gostling | 403/49 |
| 3,880,533 | 4/1975 | Gostling | 403/189 |
| 3,992,118 | 11/1976 | Siegers | 403/171 |
| 4,039,264 | 8/1977 | Sharp | 403/246 |
| 4,044,523 | 8/1977 | Layher | 52/638 |
| 4,090,798 | 5/1978 | Barton | 403/171 |
| 4,180,342 | 12/1979 | Layher | 403/24 |
| 4,273,463 | 6/1981 | Dobersch | 403/246 |
| 4,369,859 | 2/1983 | Smits | 182/179 |
| 4,445,307 | 5/1984 | Puccinelli et al. | 52/638 |

FOREIGN PATENT DOCUMENTS

| | | | |
|---|---|---|---|
| 2352194 | 12/1977 | France | 403/49 |
| 7801928 | 8/1979 | Netherlands | 403/49 |
| 1163533 | 9/1969 | United Kingdom . | |
| 1310529 | 3/1973 | United Kingdom . | |

*Primary Examiner*—Andrew V. Kundrat
*Attorney, Agent, or Firm*—Robert C. Tucker; William David Kiesel

[57] ABSTRACT

An improved scaffold connection is provided, comprising a first ring member having an upper side and a lower side, fixedly attachable to a vertical scaffold member; a connector body having a first end, a second end, a top, a bottom and sides, fixedly attachable at its second end to one end of a horizontal scaffold member having an upper surface, the connector body including a section for attachment of the connector body to the upper side of the first ring member, extending from the first end of the connector body; a cavity, extending through the body and opening exterior of the body at a first opening in the first end and a second opening in the second end; and a support element fixedly positioned in the cavity, the support element having a curved support surface; and a latch member, positioned in the cavity and having a first end extending through the first opening, the latch member being pivotal within the cavity and having a curved base section, matingly slidable on and supported by the support surface.

13 Claims, 7 Drawing Sheets

SCAFFOLD CONNECTION

This is a continuation-in-part application of application Ser. No. 581,738 filed Sept. 13, 1990 now U.S. Pat. No. 5,028,164.

BACKGROUND OF THE INVENTION

1. Field of the Invention

This invention relates generally to connections for scaffolding and, more particularly, to scaffolding connections between horizontal and vertical scaffold members.

2. Prior Art

Many different designs have been employed to secure the ends of horizontal scaffold members to vertical scaffold members. Because of a concern for a positive locking arrangement, most recent prior art connections employ a wedge assembly, whereby the connection between a horizontal and a vertical member is held in place by some type of wedge, which is usually driven into place. In order to remove a connection, the wedge must be driven out. Of course, tools are necessary to install or dismantle such connections. Examples of such assemblies can be seen in U.S. Pat. Nos. 4,445,307 and 4,273,463.

Thus, one major concern with prior art connections is the ease of installing and dismantling scaffold members. Also, most prior art connections do not allow scaffold boards to be placed immediately adjacent to vertical scaffold members due to upwardly protruding parts of the connection assembly. This situation results in undesirable uncovered spaces in scaffold installations. Further, the construction of prior art connections makes the stacking of unassembled scaffold members difficult.

SUMMARY OF THE INVENTION

Therefore, it is an object of this invention to provide an improved scaffold connection which can be quickly and efficiently installed or dismantled without the aid of tools.

It is another object of this invention to provide an improved scaffold connection which enables scaffold planks to be placed directly adjacent to a vertical scaffold member.

It is yet another object of this invention to provide an improved scaffold connection which facilitates stacking of disassembled scaffold members.

It is a further object of this invention to provide an improved scaffold connection which accomplishes all or some of the above objects and positively and safely locks a horizontal and a vertical scaffold member together until removal is desirable.

Accordingly, an improved scaffold connection is provided, comprising a first ring member having an upper side and a lower side, fixedly attachable to a vertical scaffold member; a connector body having a first end, a second end, a top, a bottom and sides, fixedly attachable at its second end to one end of a horizontal scaffold member having an upper surface, the connector body including a section for attachment of the connector body to the upper side of the first ring member extending from the first end of the connector body; a cavity, extending through the body and opening exterior of the body at a first opening in the first end and a second opening in the second end, and a support surface forming the base of the first opening; and a latch member, positioned in the cavity and having a first end extending through the first opening, the latch member being pivotal within the cavity so as to bear against the support surface when the first end is positioned below the lower side of the first ring member.

DETAILED DESCRIPTION OF PREFERRED EMBODIMENTS OF THE INVENTION

Figure 1:
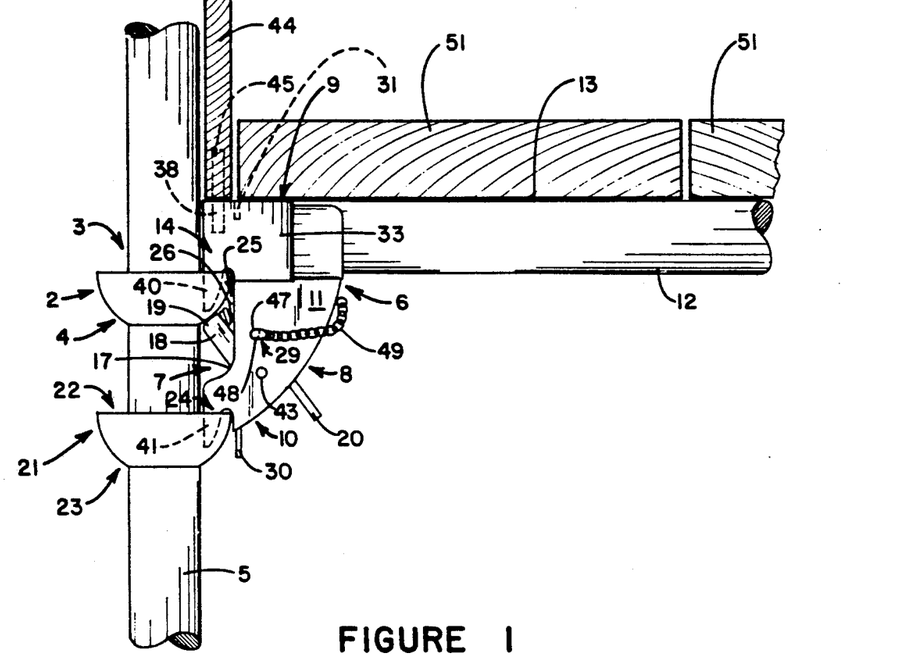
FIG. 1 is a side view of o embodiment of the invention.
Figure 2:
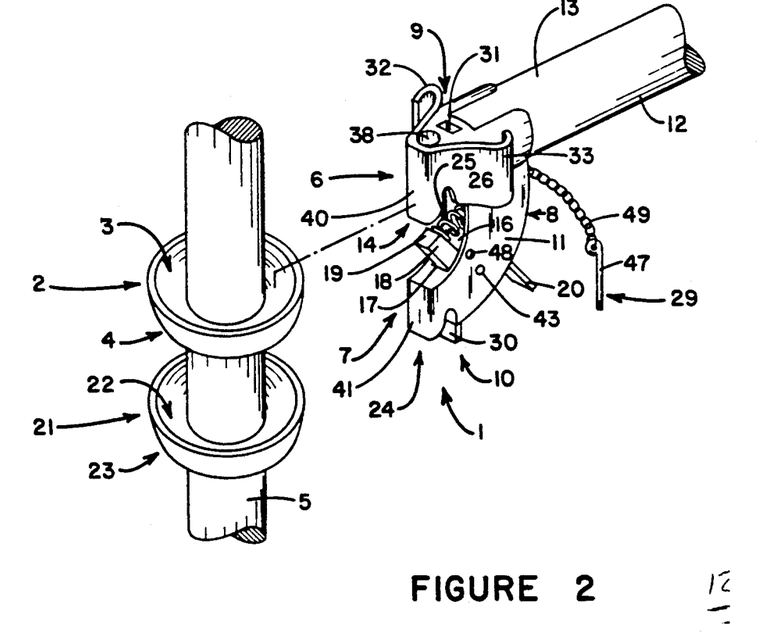
FIG. 2 is a disassembled perspective view of the embodiment of the invention shown in FIG. 1.

The Figures depict various embodiments of the improved scaffold connection 1, all of which incorporate the unique operational characteristics of the invention. As shown in FIGS. 1 and 2 the connection 1 includes a first ring member 2, which is fixedly attached to a vertical scaffold member 5, preferably by welding. First ring member 2 has an upper side 3 and a lower side 4. While not required, additional redundancy and stability can be obtained by the addition of second ring member 21 having upper side 22 and lower side 23, spaced below and attached similar to first ring member 2. A connector body 6 is fixedly attached to horizontal scaffold member 12, also preferably by welding. Connector body 6 has a first end 7, a second end 8, a top 9, a bottom 10 and sides 11. A means 14 for attachment of connector body 6 to upper side 3 of first ring member 2 extends from first end 7 of body 6. Preferably, means 14 should take the form of first hook portion 40, which matingly hooks onto upper side 3 of 15 first ring member 2. If second ring member 21 is utilized, another means 25 is provided for attachment of connector body 6 to upper side 22 of second ring member 21. Preferably, means 25 should take the form of second hook portion 41, which matingly hooks onto upper side 22 of second ring member 21.

A cavity 15 is provided within body 6, extending exterior of first end 7 of body 6 through first opening 16. A support surface 17 forms the base of first opening 16. A latch member 18 is positioned within cavity 15, and is provided with a first end 19 extending through first opening 16. Latch member 18 is pivotal within cavity 15 so as to bear against support surface 17 when first end 19 is positioned below lower side 4 of first ring member 2, locking horizontal scaffold member 12 in place as shown in FIG. 1. Although first end 19 could bear against vertical scaffold member 5 when installed, it is preferable that support surface 17 support latch member 18 as shown in order to prevent undue loading of latch pin 43.

Figure 3:
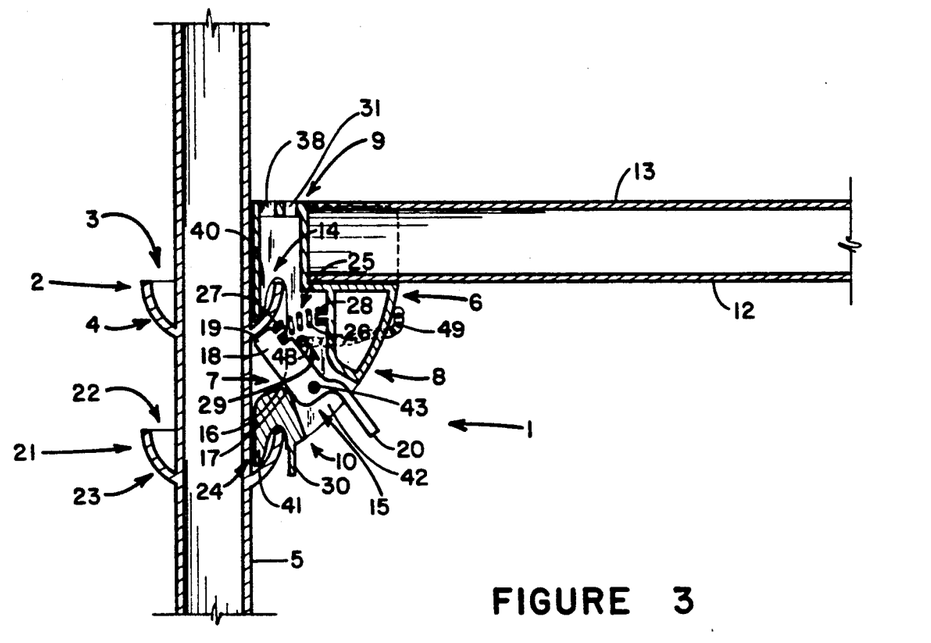
FIG. 3 is a sectional view of the embodiment shown in FIG. 1.

In the embodiment shown in FIGS. 1-3, cavity 15 also opens exterior of second end 8 of body 6 through second opening 42. Latch member 18 is pivotally held in place by latch pin 43. A resilient means 25 for urging latch member 18 toward support surface 17 is provided. Preferably resilient means 25 comprises a spring 26, contained by spring studs 27 and 28, biasing latch member 18 against support surface 17. Thus, in order to install the connection 1 shown in FIGS. 1-3, second end 20 of latch member 18 is simply depressed, compressing spring 44 while connector body 6 is hooked into place. Then, latch member 18 is released allowing first end 19 to fall into position below lower side 4 of first ring member, locking the connection 1 into place. Support surface 17 may be as little as a lower edge of first opening 16, but is preferably of a greater area in order to provide increase support against uplift of horizontal scaffold member 12. It is also preferable that first end 19 of latch member 18 be substantially heavier than second end 20, such that the weight of first end will naturally keep latch member 18 in the locked position shown in the Figures, should spring 26 fail. For further safety, a means 29 is provided for retaining latch member 18 in position below lower side 4 of first ring member 2. Means 29 can take various forms known in the art, including retainer pin 47, which fits into retainer pin hole 48 on connector body 6. Retainer pin 47 is supported by chain 49 when not in use.

Figure 4:
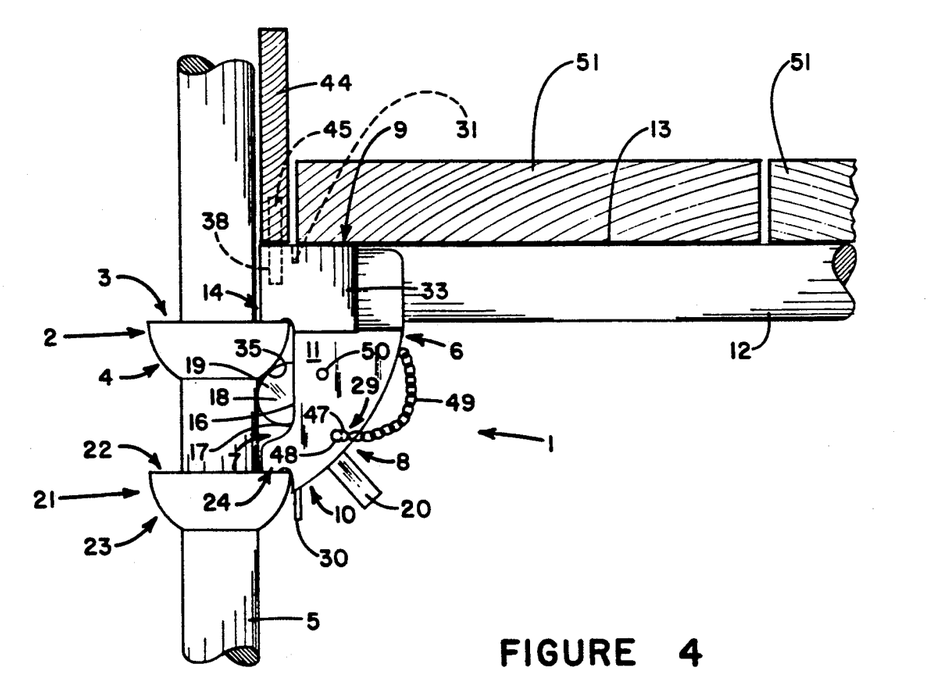
FIG. 4 is a side view of one embodiment of the invention.
Figure 5:
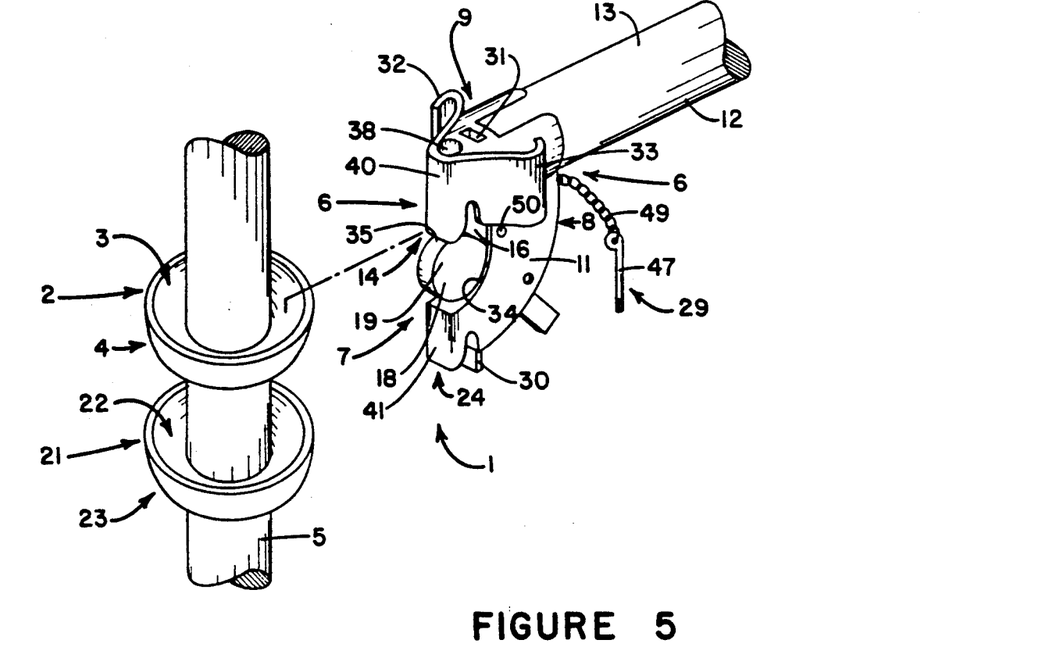
FIG. 5 is a disassembled perspective view of the embodiment of the invention shown in FIG. 3.
Figure 6:
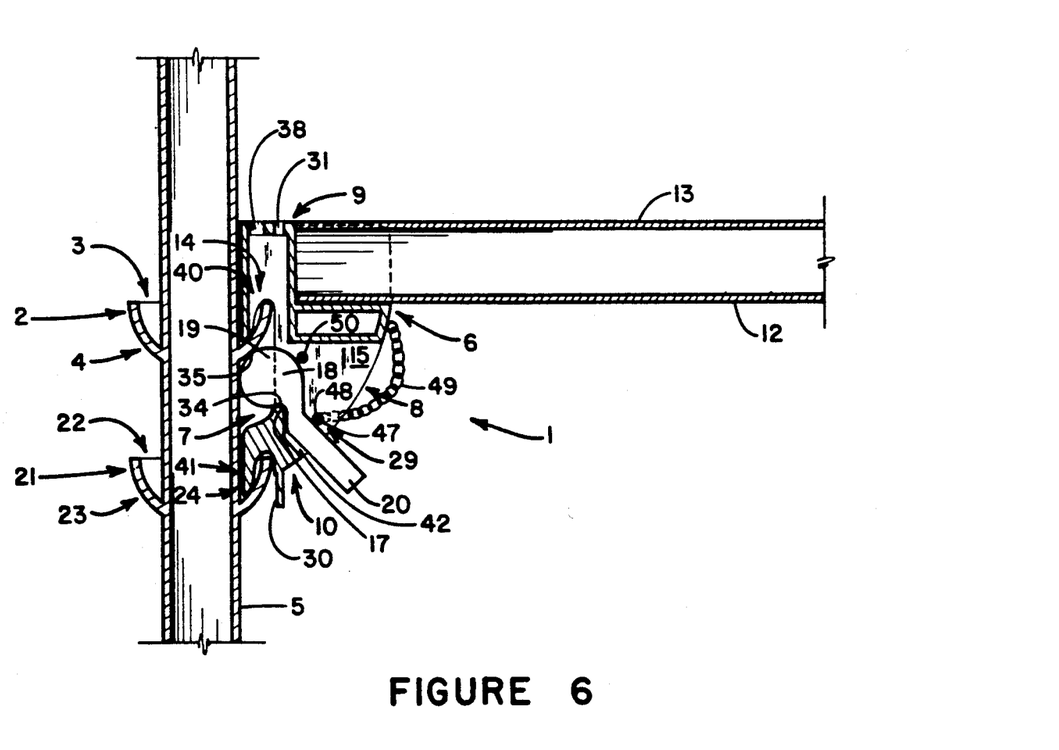
FIG. 6 is a sectional view of the embodiment shown in FIG. 3.
Figure 7:
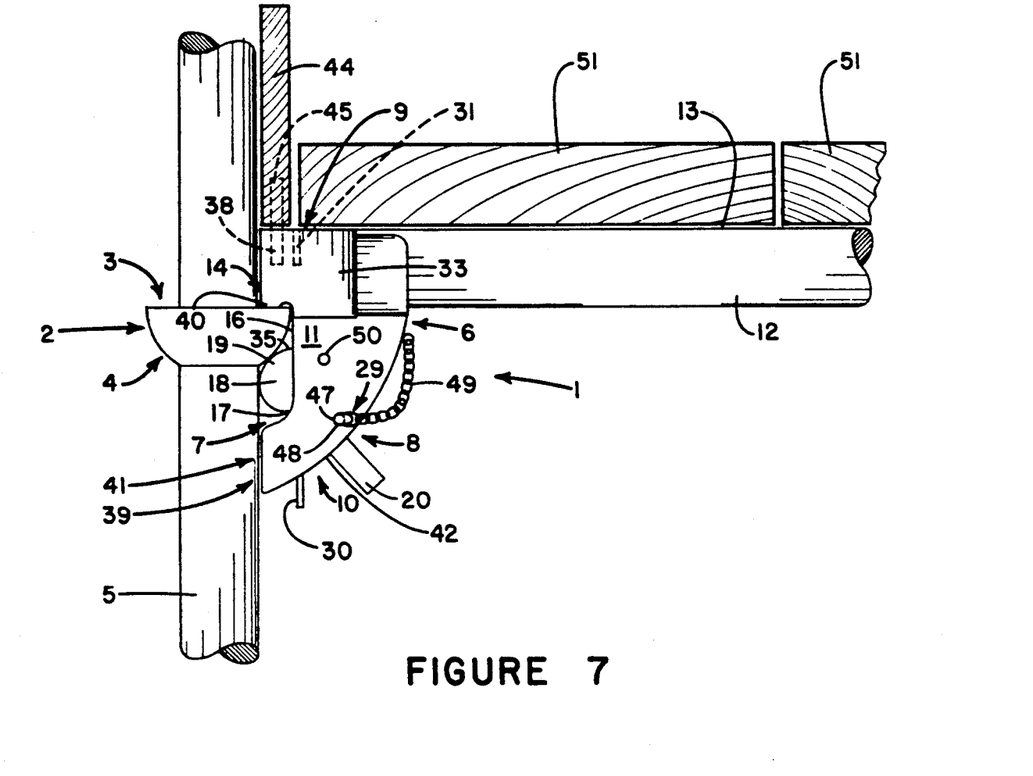
FIG. 7 is a side view of an alternate embodiment of the invention.

FIGS. 4-7 depict an alternate embodiment of the invention. First end 19 of latch member 18 is provided with a curved base section 34 and a cam surface 35. Base section 34 bears against and rockingly pivots on support surface 17. In order to lock the connection 1 into position (as shown in FIG. 4), second end 20 of latch member 18 is simply urged downward, pivoting latch member 18 and forcing cam surface 35 into contact with lower side 4 of first ring member 2. Retainer pin 47 is placed in hole 48 to maintain the connection. Additionally, a cavity pin 50 is provided to help contain latch member 18, preventing it from falling through cavity 15. Unlocking the connection 1 is accomplished by reversing the process. FIG. 5 shows the connection 1 in unlocked position. FIG. 7 illustrates an embodiment of the invention 1 without second ring member 21 or means 24. An abutment means 39 is provided to support the lower portions of connector body 6 against vertical scaffold member 5.

Figure 8:
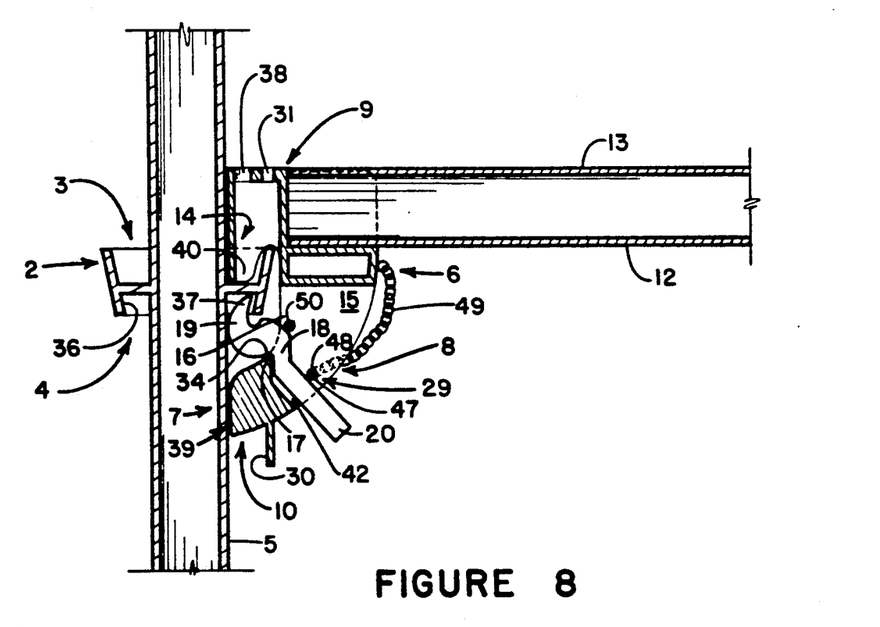
FIG. 8 is a sectional view of an alternate embodiment of the invention.

A slightly different version of the embodiments shown in FIGS. 4-7 is shown in FIG. 8. In this embodiment, first end 19 of latch member 18 is provided with a hook section 37, which hooks into contact with an annular flange 36 on lower side 4 of first ring member 2.

Figure 9:
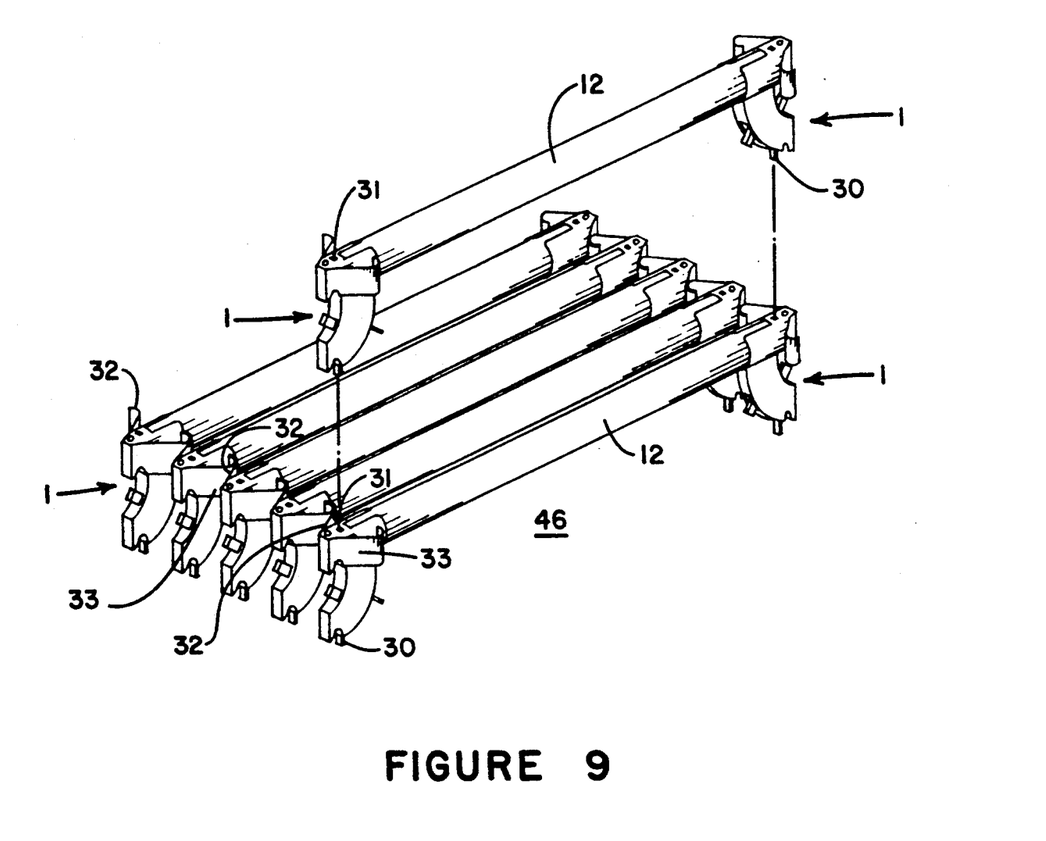
FIG. 9 is a perspective view of several horizontal scaffold members in a stacked arrangement utilizing the invention.

The design of all embodiments of the invention 1 allows for scaffold planks 51 to be placed directly on top of connector body 6 and adjacent to vertical scaffold member 5 if desirable. Also, toe board support socket 38 allows for optional placement of toe boards 44 adjacent to vertical scaffold member 5 using toe board lugs 45 as shown in FIG. 1. The streamlined design of the invention 1 also facilitates stacking of horizontal scaffold members 12 as shown in FIG. 9. Stacking lugs 30, extending from the bottoms 10 of connector bodies 6 are positionable in lug alignment sockets 31 in the tops 9 of connector bodies 6. Further, each connector body 6 is provided with a stabilizer flange 32 and a retainer flange 33, extending from opposite sides 11 of body 6. The retainer flange 33 is adapted to receive the adjacent stabilizer flange 32 of an adjacent connector body 6 when horizontal scaffold members 12 are stacked as shown in FIG. 9. Thus, stacking lugs 30, sockets 31 and flanges 32 and 33 provide an extremely stable way to stack and move groups of horizontal scaffold members 12. The forks of a forklift are easily insertable through space 46 beneath scaffold members 12, allowing a large quantity of members 12 to be stacked and moved quickly and safely.

Figure 10:
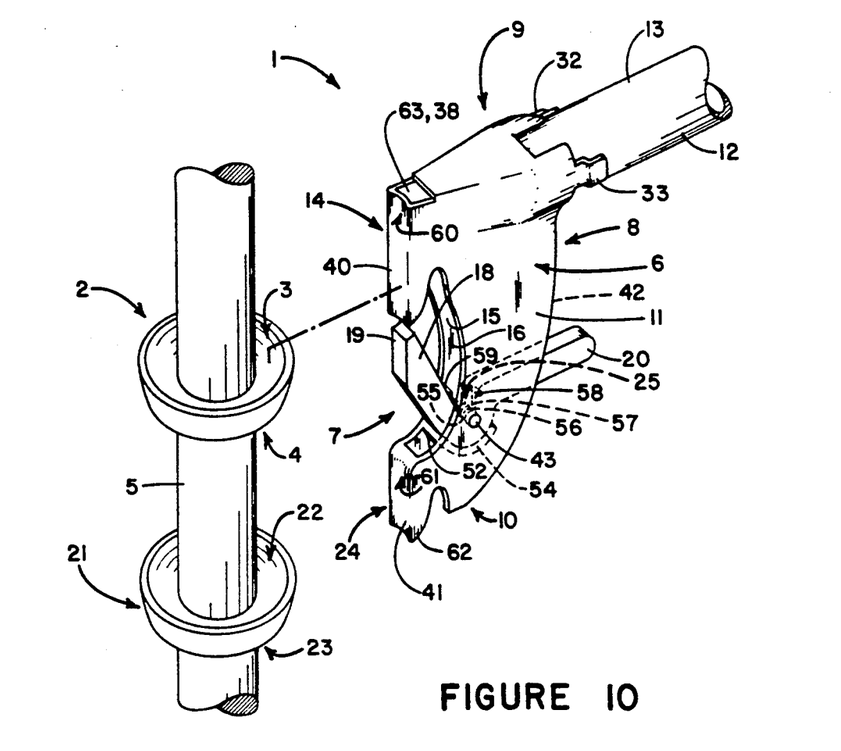
FIG. 10 is a disassembled perspective view of an alternate embodiment of the invention.
Figure 11:
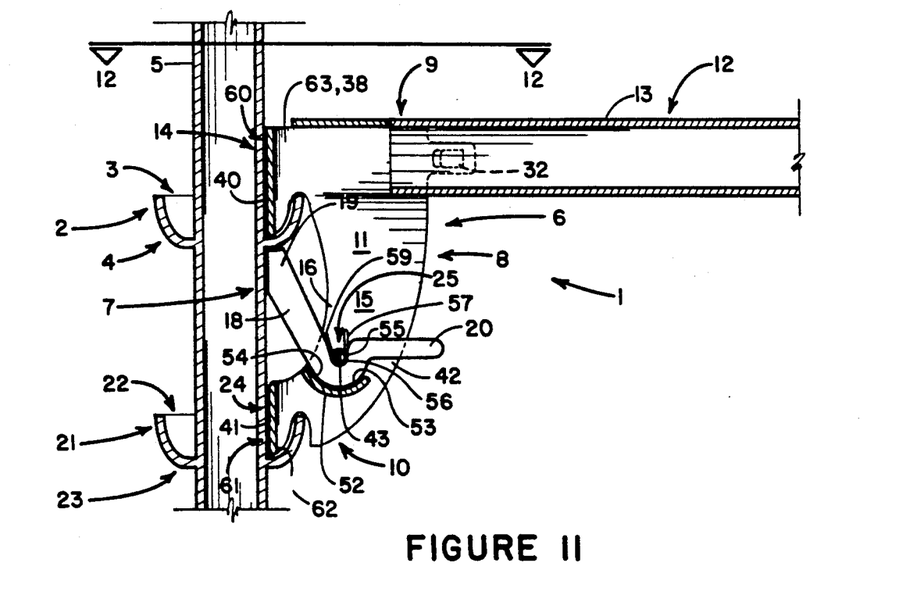
FIG. 11 is a sectional side view of the embodiment shown in FIG. 10 in assembled position.
Figure 12:
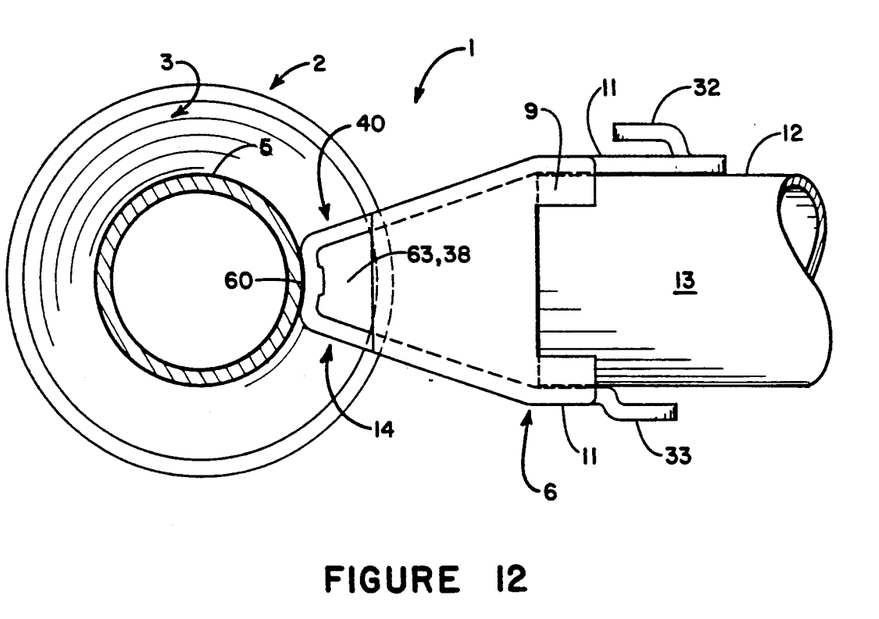
FIG. 12 is a sectional top view of the embodiment shown in FIG. 11 taken along section line 12—12 of FIG. 11.

A further alternate embodiment of the invention can be seen in FIGS. 10-12. As shown in FIGS. 10 and 11, connector body 6 can be adapted to include a support element 52 having curved support surface 53. Latch member 18 includes a curved base section 54, matingly slidable on and supported by support surface 53, similar to the arrangement shown in FIGS. 6 and 8, except that support surface 53 is concave with respect to base section 54. This embodiment allows support element 52 to cradle latch member 18, providing increased surface area for support against uplift loads. Of course, the curvature of support surface 53 could be reversed to be convex with respect to base section 54, similar to FIGS. 6 and 8, but providing an increased surface area for support similar to that shown in FIGS. 10 and 11.

In the embodiment shown in FIGS. 10 and 11, latch member 18 has a greater degree of curvature due to curved base section 54. First end 19 is adapted to fit just beneath first ring member 2, and to rest against vertical scaffold member 5 when the scaffold connection 1 is assembled. Latch member 18 is provided with a notch 55 above base section 54 in which latch pin 43 fits, holding latch member 18 in cavity 15. In this embodiment, it is preferred that resilient means 25 take the form of a hairpin spring 56 which is wrapped around latch pin 43 and has an anchor end 57 anchored into spring hole 58 in side 11 of connector body 6. Bearing end 59 of hairpin spring 56 bears against latch member 18 as shown, urging latch member 18 toward vertical scaffold member 5.

First and second hook portions 40,41 have curved abutment faces 60,61 for a more mating engagement with vertical scaffold member 5. Also, the end 62 of second hook portion 41 extends to a point below the bottom 10 of connector body 6. This modification allows end 62 to fit into alignment socket 63 (see FIG. 12) when scaffold members are stacked for storage or transportation, eliminating the need for stacking lugs 30, and allowing alignment sockets 63 to also serve as a toe board support socket 38.

As can be seen, an improved scaffold connection is provided which securely locks a horizontal scaffold member to a vertical scaffold member, eliminating the need for driven wedges to provide such a connection. The improved connection is versatile in its application, and allows more efficient use of scaffold members. Other embodiments of the invention will occur to those skilled in the art, and are intended to be included within the scope and spirit of the following claims.

I claim:

1. An improved scaffold connection, comprising:
   a. a first ring member having an upper side and a lower side, fixedly attachable to a vertical scaffold member;

b. a connector body having a first end, a second end, a top, a bottom and sides, fixedly attachable at said second end to one end of a horizontal scaffold member having an upper surface, said connector body including:
 i. a means for attachment of said connector body to said upper side of said first ring member, extending from said first end of said connector body;
 ii. a cavity, extending through said body and opening exterior of said body at a first opening in said first end; and
 iii. a support element fixedly positioned in said cavity said support element having a curved support surface; and
b. a latch member, positioned in said cavity and having a first end extending through said first opening and adapted so as to be positionable below said lower side of said first ring member, said latch member being pivotal within said cavity and having a curved base section, matingly slidable on and supported by said support surface.

2. An improved scaffold connection according to claim 1, further comprising:
c. a second ring member having an upper side and a lower side, fixedly attachable to said vertical scaffold member at a point spaced below said first ring member; and
wherein said connector body further includes:
 iv. a means for attachment of said connector body to said upper side of said second ring member, extending from said first end of said connector body.

3. An improved scaffold connection according to claim 1, further comprising:
c. a resilient means for urging said latch member toward said support surface, operably attached to said connector body and said latch member.

4. An improved scaffold connection according to claim 1, wherein said cavity opens exterior of said body at a second opening in said second end of said connector body and said latch means includes a second end extending through said second opening.

5. An improved scaffold connection according to claim 2, wherein said means for attachment of said connector body to said upper side of said first ring member includes a first hook portion and said means for attachment of said connector body to said upper side of said second ring member includes a second hook portion, said second hook portion having an end extending to a point below said bottom of said connector body, and wherein said connector body further includes:
 v. an alignment socket positioned on said top of said connector body and adapted to receive said end of said lower hook portion of a second said scaffold connection.

6. An improved scaffold connection according to claim 1, wherein said connector body further includes:
 iv. a stabilizer flange extending from one said side of said connector body; and
 v. a retainer flange, adapted to receive an adjacent said stabilizer flange, extending from the opposite side of said connector body from said stabilizer flange.

7. An improved scaffold connection according to claim 1, wherein said connector body is attachable to said horizontal scaffold member at a point on said connector body such that said top of said connector body is level with said upper surface of said horizontal scaffold member.

8. An improved scaffold connection according to claim 1, wherein said connector body is provided with an abutment means for supporting said connector body against said vertical scaffold member, extending from said first end of said connector body below said latch means.

9. An improved scaffold connection according to claim 5, wherein said connector body further includes:
 vi. a stabilizer flange extending from one said side of said connector body; and
 vii. a retainer flange, adapted to receive an adjacent said stabilizer flange, extending from the opposite side of said connector body from said stabilizer flange.

10. An improved scaffold connection according to claim 3, wherein said resilient means includes a spring.

11. An improved scaffold connection according to claim 1, wherein said support surface is concave with respect to said base section of said latch member.

12. An improved scaffold connection according to claim 1, wherein said latch member is provided with a notch above said base section, and wherein said connector body includes a latch pin positioned between said sides and within said notch of said latch member.

13. An improved scaffold connection according to claim 1, wherein said latch member is adapted so as to rest against said vertical scaffold member just below said first ring member when said scaffold connection is assembled.

* * * * *